US008688738B2

(12) United States Patent
Colton et al.

(10) Patent No.: US 8,688,738 B2
(45) Date of Patent: Apr. 1, 2014

(54) COLLABORATIVE CONTENT GENERATION SYSTEM AND METHOD

(75) Inventors: Paul Colton, Hillsborough, CA (US); Robin Sean Debreuil, Miami (CA); Kevin Edward Lindsey, Fort Worth, TX (US); Roland Ingomar Muschenetz, Cambridge, MA (US); Donald Arthur Washburn, Bellevue, WA (US)

(73) Assignee: Appcelerator, Inc., Mountain View, CA (US)

( * ) Notice: Subject to any disclaimer, the term of this patent is extended or adjusted under 35 U.S.C. 154(b) by 0 days.

(21) Appl. No.: 13/175,570

(22) Filed: Jul. 1, 2011

(65) Prior Publication Data

US 2012/0005575 A1    Jan. 5, 2012

Related U.S. Application Data

(63) Continuation of application No. 11/735,428, filed on Apr. 13, 2007, now abandoned.

(60) Provisional application No. 60/792,298, filed on Apr. 14, 2006.

(51) Int. Cl.
*G06F 17/30* (2006.01)
(52) U.S. Cl.
USPC ............ 707/791; 707/802; 707/822; 707/828
(58) Field of Classification Search
USPC .................................................. 707/600–899
See application file for complete search history.

(56) References Cited

U.S. PATENT DOCUMENTS

| | | | |
|---|---|---|---|
| 7,596,620 B1 | 9/2009 | Colton et al. | |
| 7,707,547 B2 | 4/2010 | Colton et al. | |
| 7,844,958 B2 | 11/2010 | Colton et al. | |
| 7,958,232 B1 | 6/2011 | Colton et al. | |
| 7,958,493 B2 | 6/2011 | Lindsey et al. | |
| 2003/0182450 A1* | 9/2003 | Ong et al. | 709/246 |
| 2004/0268364 A1* | 12/2004 | Faraj | 719/316 |
| 2005/0235012 A1* | 10/2005 | Harry et al. | 707/203 |
| 2006/0004703 A1* | 1/2006 | Spivack et al. | 707/2 |
| 2007/0192687 A1* | 8/2007 | Simard et al. | 715/523 |

OTHER PUBLICATIONS

Portions of the prosecution history of U.S. Appl. No. 11/735,428.
Portions of the prosecution history of U.S. Appl. No. 12/270,817.
Portions of the prosecution history of U.S. Appl. No. 12/270,868.

(Continued)

*Primary Examiner* — Isaac M Woo
(74) *Attorney, Agent, or Firm* — Staniford Tomita LLP

(57) ABSTRACT

A system and method for managing the collaborative generation of content for an electronic document such as software applications, computer programs and the like. A source content item is created at a source development environment and accessed over a network by a plurality of users of a user community. Each of the plurality of users is located at a unique remote site. The source content item can be downloaded by each of the plurality of users and maintained at each remote site as a unique content presentation item. In one embodiment, the user can edit his or her content presentation item and upload the edits for incorporation into the source content item.

20 Claims, 5 Drawing Sheets

(56) References Cited

OTHER PUBLICATIONS

Portions of the prosecution history of U.S. Appl. No. 12/273,539.
Portions of the prosecution history of U.S. Appl. No. 12/275,182.
Portions of the prosecution history of U.S. Appl. No. 12/275,213.
Portions of the prosecution history of U.S. Appl. No. 12/276,327.
Portions of the prosecution history of U.S. Appl. No. 12/276,336.
Portions of the prosecution history of U.S. Appl. No. 12/276,337.
Portions of the prosecution history of U.S. Appl. No. 12/325,239.
Portions of the prosecution history of U.S. Appl. No. 12/325,240.
Portions of the prosecution history of U.S. Appl. No. 12/325,268.
Portions of the prosecution history of U.S. Appl. No. 12/326,103.
Portions of the prosecution history of U.S. Appl. No. 12/326,110.
Portions of the prosecution history of U.S. Appl. No. 12/326,861.
Portions of the prosecution history of U.S. Appl. No. 12/326,891.
Portions of the prosecution history of U.S. Appl. No. 12/326,910.
Portions of the prosecution history of U.S. Appl. No. 12/327,330.
Portions of the prosecution history of U.S. Appl. No. 12/327,802.
Portions of the prosecution history of U.S. Appl. No. 12/334,434.
Portions of the prosecution history of U.S. Appl. No. 12/563,159.
Portions of the prosecution history of U.S. Appl. No. 12/766,908.
Portions of the prosecution history of U.S. Appl. No. 12/955,881.
Portions of the prosecution history of U.S. Appl. No. 13/154,090.

* cited by examiner

COLLABORATIVE CONTENT GENERATION SYSTEM AND METHOD

CROSS REFERENCE TO RELATED APPLICATIONS

The present application is a continuation of U.S. patent application Ser. No. 11/735,428, filed on Apr. 13, 2007 now abandoned, which claims the benefit of U.S. patent application No. 60/792,298, filed on Apr. 14, 2006. The entire disclosure of each of the foregoing applications is hereby incorporated by reference as if set forth verbatim herein and relied upon for all purposes.

FIELD OF THE INVENTION

The present invention relates generally to content generation, and more particularly to a system and method for collaborative content generation.

BACKGROUND OF THE INVENTION

Software applications and other software programs generally comprise logical code or program logic and other related content. The logical code is typically maintained in what is referred to as source code. Source code is written by a program in a given programming language and can be converted from human-readable (and editable) form into a machine readable form for execution by a processing device. Such conversion is usually performed by a compiler designed for a given computer architecture. Source code can also be executed directly with the aid of what is referred to as an interpreter. In other words, source code can be compiled into object code or run by an interpreter.

Software can be created in any number of diverse software development environments, from simple instantiations of a programming language and related utilities, to large suites such as integrated development environments, or IDEs. Integrated development environments often include editors, debuggers and other tools used to aid developers in their tasks.

Content associated with a software program can include the code itself, full-sized documents such as, for example, help files, and can also include micro-content such as message and snippets that drive the content that appears in dialogues, view and controls for the program. As these examples illustrate, various forms of content can be created and exist for a software application or other program.

Wiki, or wiki software, refers to a collaborative software which facilitates the operation of a website that allows users to easily add and edit content. A wiki system provides various tools which allow the user community to easily monitor and discuss the constantly changing state of the wiki in order to achieve a general consensus on the wiki content. A wiki allows for the collective writing of electronic documents in a simple markup using a web browser. A single page in a wiki is referred to as a "wiki page," while the entire collection of pages, typically interconnected through hyperlinks, is "the wiki." A wiki typically has a user-editable "source code, a template and a rendered Hyper Text Markup Language ("HTML") code. Wikis must be used exclusively online. A single wiki page can result in multiple content fragments. Wikis allow the individual user to view the information in a new "style" (i.e., new graphics, etc.), but the content is structurally the same as before. One example of a wiki is found at www.wiki.edia.org.

Subversion, also referred to as SVN, is a revision control system which allows computer software to be developed in an incremental and controlled manner by a group of computer programmers, SVN is generally internally composed of layered libraries, which allows programmers to create their own software tools at a preferred level of complexity and specificity.

SUMMARY OF THE INVENTION

Both the Wiki and SVN only act as the "repository" for the data being edited. However, the present invention takes the source content, transforms the source content into a number of different formats (i.e., for tooltips in code assist, or product walkthroughs), embeds links inside the number of different formats back to the original source text, and caches that content as part of the installed product.

In the present invention, a wiki page preferably acts as a data repository, while an IDE preferably acts as a user interface ("UI") "viewer" to the data on the wiki page through a variety of presentations, and a layer in between preferably acts as an intermediary to transform the data from the source to the destination as part of the application build or deployment process.

A SVN server may also be utilized with the present invention as a substitution for a wiki page, however, clicking on an edit link would access the latest version from the SVN server, and allow the user to edit the content. Once the user finished editing the content, a click of a submit button would commit the changed content to the repository.

One aspect of the present invention is a method for managing the collaborative generation of an electronic content item by multiple users over a network. The method begins with providing a source development environment. Next, an original content item is created in the source development environment. Next, the original content item is transferred over a network from the source development environment to a plurality of users of a user community, with each of the plurality of users located at a unique remote site. Next, the original electronic content item is edited by at least one of the plurality of users at a unique remote site to create a local copy electronic content item comprising at least one edited component. Next, the local copy electronic content item is transferred from the unique remote site over the network to the source development environment. Next, the at least one edited component from the local copy content item is incorporated into the original content item to create a current version electronic content item. Next, the current version electronic content item is transferred to each of the plurality of users of the user community.

The electronic content item is preferably selected from the group consisting of a software program, a web site and a computer program. The network is preferably the internet.

The electronic content item is most preferably a source code, and the method further includes spawning an application shell from a master template and transferring the application shell for the source code to each of the plurality of users of the user community.

Another aspect of the present invention is a method for managing the collaborative generation of an electronic content item by multiple users over a network by utilizing a wiki page. The method begins by creating an original source content item on a wiki page. Next, a link to the wiki page is provided to a plurality of users of a user community. Next, one of the plurality of users of the user community links to the wiki page. Next, the original source content item is edited by at least one of the plurality of users at a unique remote site to create an edited source content item comprising at least one edited component. Next, the at least one edited component from the edited source content item is incorporated into the original source content item to create a current version source content item. Finally, the wiki page is refreshed to provide the current version source content item on the wiki page.

Another aspect of the present invention is a method for managing the collaborative generation of an electronic content item by multiple users over a network by creating edit links for use in the collaboration. The method begins by creating an original electronic content item on a wiki page. The wiki page is accessible by a plurality of users of a user community over a network, with each of the plurality of users located at a remote site. Next, the original electronic content item is transformed into a plurality of presentation formats. Each of the plurality of presentation formats has an edit link for linking to the original electronic content item on the wiki page. Next, one of the plurality of presentation formats is edited by accessing the respective edit link by at least one of the plurality of users to create an edited portion of the original electronic content item. Next, the original electronic content item is updated with the edited portion of the original electronic content item by running an update process to create a current version electronic content item. Finally, the wiki page is refreshed to publish the current version electronic content item.

The electronic content item is preferably a snippet for an electronic document of a software application.

Another aspect of the present invention is a method for managing the collaborative generation of an electronic content item by multiple users over a network by transparently transforming an original electronic content item on a wiki page. The method begins by creating an original electronic content item on a wiki page. The wiki page is accessible by a plurality of users of a user community over a network, with each of the plurality of users located at a remote site. Next, the original electronic content item is transformed into a plurality of presentation formats. Each of the plurality of presentation formats has an edit link for linking to the original electronic content item on the wiki page. Next, one of the plurality of presentation formats is edited by accessing the respective edit link by at least one of the plurality of users to create an edited portion of the original electronic content item. Finally, the original electronic content item is transparently transformed on the wiki page during the editing of the one of the plurality of presentation formats by the user.

Another aspect of the present invention is system for managing the collaborative generation of an electronic content item by multiple users over a network. The system includes a source content development environment, a network, and a plurality of remote user sites of a user community. The source content development environment facilitates the development of a software application. The source content development environment comprises a source content version. Each of the plurality of remote user sites is capable of accessing and downloading the source content version of the source content development environment over the network to create a local content presentation item of the source content version for editing at the remote user site by a user to create an edited local content presentation item. The local content presentation item has an edit link comprising context related information indicating the location and presentation of the source content version.

The source content version is preferably selected from the group consisting of a software program, a snippet, a web site and a computer program. The network is preferably the internet One object of the present invention is to provide a system and method for managing the collaborative generation of an electronic content item by multiple users over a network that allows for information to be cached for offline use.

Having briefly described the present invention, the above and further objects, features and advantages thereof will be recognized by those skilled in the pertinent art from the following detailed description of the invention.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 4 is an image of a content item in an integrated development environment.

FIG. 5 is an image of edits to the content item of FIG. 4.

FIG. 6 is an image of the modified content item in the integrated development environment.

DETAILED DESCRIPTION OF PREFERRED EMBODIMENTS

The present invention is directed toward a system and method for providing a content management system for content associated with software applications, computer programs and the like. In one embodiment, the present invention provides a system and method for collaborative generation and management of such content, and the features and functionality can be distributed across a geographically diverse environment.

Before describing the invention in detail, it is useful to describe an example environment in which the invention can be implemented. One such example environment is that of a development environment, such as an integrated development environment ("IDE"). From time-to-time, the present invention is described herein in terms of this example development environment. Description in terms of this environment is provided to allow the various features and embodiments of the invention to be portrayed in the context of an exemplary application. Examples of a few alternative environments include, without limitation, standard consumer applications, such as Microsoft Word, Quicken and others. After reading this description, it will become apparent to one of ordinary skill in the art how the invention can be implemented in any of a number of different and alternative environments. One such IDE is set forth at www.aptana.com, which is hereby incorporated by reference in its entirety. The APTANA IDE is an open-source, cross-platform, JAVA script-focused development environment for preferably building AJAX applications.

Figure 1:
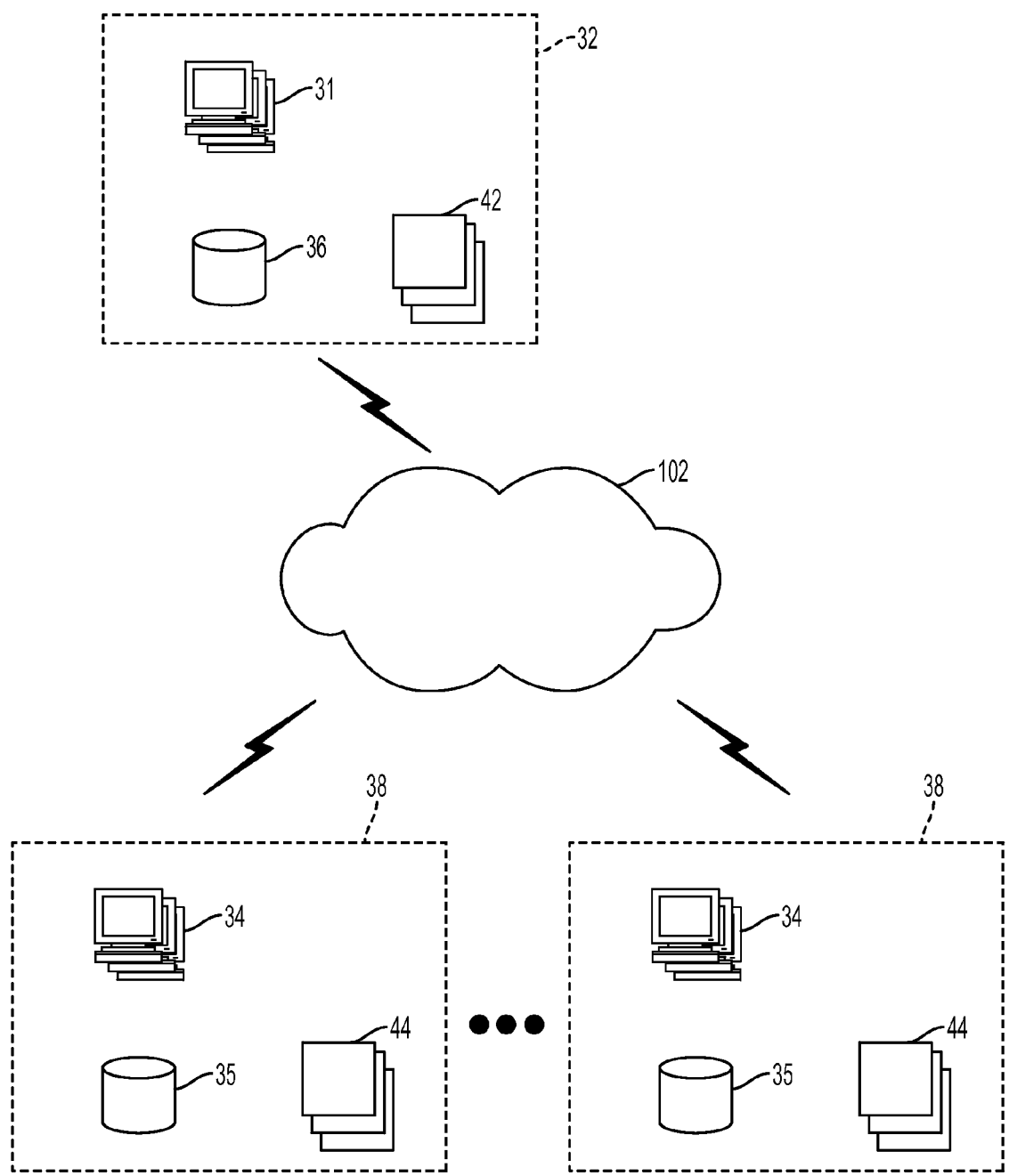
FIG. 1 is a diagram illustrating an example development environment and user community in accordance with one embodiment of the invention.

FIG. 1 is a diagram illustrating an example development environment that can be used in accordance with one or more embodiments of the present invention. Referring now to FIG. 1, a source content development environment 32 is provided to facilitate the development of software applications or other software programs by one or more software developers. Source development environment 32 can include one or more servers, work stations, and other components, (generally illustrated as item 31) as well as languages, compliers, editors, and other tools used by developers in the development environment. Development environment 32 is preferably confined to a single geographic location or alternatively can be distributed across a plurality of geographic locations. A geographically diverse configuration would typically include one or more communication channels (networks or otherwise) among the various development locations to allow for a collaborative work environment. In one embodiment, source content development environment includes an IDE, that includes a suite of tools to assist in the software development projects.

As stated above, software developers associated with source content development environment 32 would typically be involved with the development of software applications and other software programs. These developers would also typically be involved with the creation of various content items associated with the software applications and software programs. These content items preferably include user manuals, help files, code snippets, code comments, and other like items that may enrich or further enhance the developer and user experience.

In the example illustrated in FIG. 1, the development environment 32 also provides associated storage for the work product generated in the development environment. For example, a source content database 36 can be included to provide storage for the content associated with software applications or other program developed within the development environment. As illustrated in FIG. 1, a source content version 42 is maintained in source content database 36 as the official configuration-control copy of the content under development or already developed and under revision.

Also illustrated in FIG. 1 are a plurality of remote sites 38 within the community that are capable of communicating with source content development environment 32 via a communication channel such as, for example, a network 102. The network is preferably the Internet. However, those skilled in the pertinent art will recognize that other networks that may be utilized without departing from the scope and spirit of the present invention. These remote sites 38 can include one or more development or user workstations 34, local data storage 35, and a communication interface back to source content development environment 32. As also illustrated in this example are local version 44 of the source content that can be stored in data storage 35 at the one or more remote sites 38. For example, remote sites 34 can include source content developers (e.g., a distributed member of the development team), beta-site users, released-version users, and other developers or users working with programs and content developed or maintained via development environment 32.

Having thus described an example environment in which the invention can be implemented, various features and embodiments of the invention are now described in further detail. Description may be provided in terms of this example environment for ease of discussion and understanding only. After reading the description herein, it will become apparent to one of ordinary skill in the art that the present invention can be implemented in any of a number of different environments.

Figure 2:
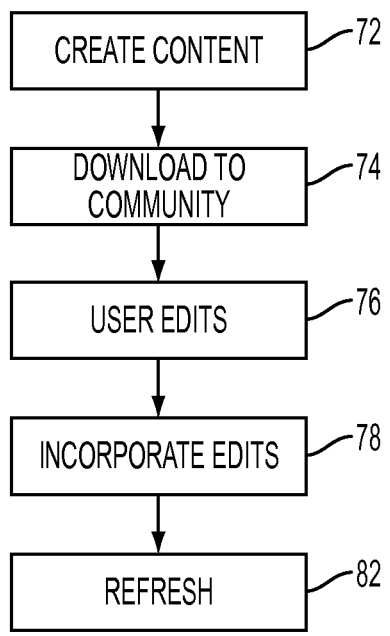
FIG. 2 is an operational flow diagram illustrating an exemplary process for providing collaborative content management in accordance with one embodiment of the invention.

FIG. 2 is an operational flow diagram illustrating an example process for providing content management in accordance with one embodiment of the invention. In a step 72, a content item is created. For example, in terms of the example environment illustrated in FIG. 1, product documents, help files, messages and snippets, and other content can be created in the development environment 32 (or even outside of the development environment—for example, at a user site 38 or elsewhere) and maintained in source content database 36. In one embodiment, the content item can be represented as wiki, website page, or other content format. As these examples illustrate, any of a number of different types of database management systems can be utilized to store, maintain, and provide access to source content items 42 in the development environment. To further elaborate on this example, a wiki is beneficial in that it can be implemented to allow users to easily add and edit content especially in a collaborative environment. The wiki and other content formats can be implemented in such a way as to record changes or edits over time and to save prior versions such that a page or other content item can be reverted to any of its previous states if desired. The content management system can also provide tools and other resources that allow the user community to monitor the states of the content as it changes and to have a dialogue concerning edits, changes, and other happenings with the dynamic content.

In one embodiment, each function signature within the content can be represented using a unique resource locator ("URL"), permalink, or other edit link. A permalink refers to a URL configured to point to content with some degree of permanence. In one embodiment, it is desirable to have permanence in these links as the content items are likely to be frequently linked to by various persons in the user community, as the further description in this example illustrates.

In a step 74, the created content item or items 42 are downloaded to the user community as appropriate. For example, in the embodiment illustrated in FIG. 1, content items 42 can be downloaded to remote sites 38 via a network 102 such as, for example, the Internet or communication network. The user community can include developers, beta-site users, end users, or other persons or entities having access to the source programs and the source content. In one embodiment, unlike prior art wiki systems, the downloaded content items are stored locally at remote sites 38 as content presentation items 44 so that they can be accessed locally by the users.

In a step 76, in reviewing or using a content item, a user may determine that he or she wishes to edit or update all or part of the content item and to share those updates with the rest of the development environment (including the rest of the user community). As stated above, in one embodiment, the content items include edit links to facilitate such changes. The edit link can contain context related information indicating the location and presentation of the content when the user clicks or selects the link. This information can be used to allow the user to annotate or amend the content with his or her changes or updates. This information may be relevant only to a specific presentation, or it may be relevant to multiple presentations throughout the environment. In one embodiment, the user can be given the opportunity to edit his or her local copy 44 of the content item independently of the content item as it is distributed throughout the environment. That is, in this embodiment, changes can be made such that they are incorporated into only the local copy 44 of that user (or within a group of users) and not propagated throughout other copies in the remainder of the development community. Alternatively, as the remainder of the process described below illustrates, edits, changes, updates and the like made by the user can be made a part of the source content item 42 and can also be propagated to other users within the community.

In a step 78, the edits made by the user to his or her local copy 44 are uploaded and incorporated into the source content 42. As described above, in scenarios where edit links and other like methodologies are provided, user updates can be made directly to source content 42 in real-time or near real-time. Because wikis and other content management systems allow version retention, such changes can be made in one embodiment to a new version of content item 42 while the then current version of content item 42 is still in use by others in the community. In another embodiment, edits to the content are made locally at the user site 38 and a copy of the edited content is subsequently uploaded to development environment 32 to replace source content item 42 and for distribution throughout the community or to designated locations in the community.

In one embodiment, the transformed version of the content can be stamped with a unique marker or other identifier indicating the version number of the document.
This can further facilitate maintenance of version histories for the content items being edited. Although a number of markers can be used, examples may include a time stamp (Coordinated Universal Time (UTC) or Zulu time is beneficial for global communities), a revision number, or other like identifier or code. Preferably, the identifier contains sufficient information to allow chronological order to be maintained in the various versions.

Additionally, mechanisms can be used to provide content update management where content is being edited simultaneously by multiple parties throughout the environment. For example, warnings can be provided to users where another user is currently editing that section of the document the first user attempted to access, locks can be placed on sections of content being edited, post-edit conflict checks can be run where simultaneous edits were made and changes introduced only where there is no conflict. In this latter example, conflict resolution policies can be put into place to resolve such issues.

Additionally, automated or manual approval mechanisms can also be implemented to provide checks and balances on the content edits requested. For example, in one embodiment, a developer responsible for a given portion of the content item or that portion of the code relating to that content item can be tasked with reviewing and approving (and perhaps further editing) edits supplied by the user community. In addition, various levels of approval authority can be given to users throughout the community to incorporate or accept edits into a source content item 42. Thus, in this latter embodiment, users in the community may belong to a certain class of users who are allowed to make updates to source content items without approval, whereas another class of users may require approval(s) at one level or another.

Once a source content item 42 has been updated, it is desirable that this source content item now be made available to other users throughout the community. Thus, in a step 82 this item can be refreshed or republished to various members of the community. In one embodiment, when a user accesses a content item, if that content item exists on his or her local server, the system can check the date or version of the local copy against the date or version of the source copy to ensure that the user has the most recent version.

Figure 3:
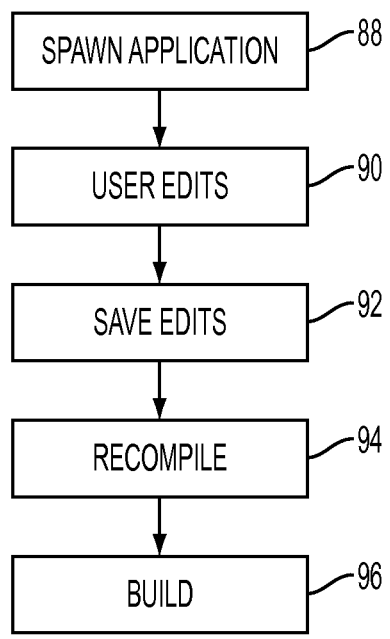
FIG. 3 is an operational flow diagram illustrating an example process for managing source code as content in accordance with one embodiment of the invention.

As stated above, content items are not limited to the examples of help files, documents, messages and snippets described above. Yet another example of content items that can be managed in accordance with the present invention is source code. FIG. 3 is an operational flow diagram illustrating an example process for managing a source code as a content item in accordance with one embodiment of the invention. Referring now to FIG. 3, in a step 88, an application shell is spawned from a master template. As in step 74 described above, a source code for the application shell is distributed to the development community or other appropriate group of users. As the application is under development by the user community, it is typically in constant development, and can morph through the source code modifications stage and into a phase in which other content is modified.

In a step 90, users can customize various behaviors of the application. In one embodiment, this can be accomplished as described above with reference to steps 76 through 78, wherein the content item edited is now one or more sections of the code. For example, a user can select an edit mode for various panels. Upon selection, the user is switched to a source code view, allowing him or her to edit the source code, modifying the behavior of the content item. In a step 92, the user can save the edits to a central location such as, for example, a source-control repository, and then the code is recompiled in a step 94. As described above, various methodologies can be implemented to ensure proper verification, validation and incorporation of edited content into the current version of the application. During the build process, in a step 96, the code can be checked out, and a new version of the application built.

With applications, it is often the case that as the application gets closer and closer to release, the mix of "content" being modified changes. Typically, the application begins as almost entirely code with little or no documentation. Thus, early on, most of the content editing is to the code. As development progresses, documentation and other similar content editing may take place.

Two simple examples of this process are described below. The first example illustrates a process by which the user updates a "Run" button for an application. In this example, the user enters the edit mode and selects the element he or she wishes to modify. In the case of the present example, the user selects the "Run" button as an item to update. After selecting the "Run" button, the source code for that button is displayed on the user's terminal for editing. The user is then allowed to modify the source code to update the button. In one embodiment, the application can automatically recompile behind the scenes to incorporate the newly edited code.

The second example is a process by which the user updates the help content for an application. In this example, the user enters the edit mode and selects an element that he or she wishes to modify. In the case of the present example, the user selects the help content as an item to update. The user is then provided with an edit view to enable editing of that content item. The user is then allowed to modify the content item as described above.

As these two simple examples illustrate, one embodiment of the invention can benefit the development process beyond managing edited content. Particularly, in one embodiment, the invention can provide a link to the user enabling the user to discover how and where to change a piece of code (or other content) to achieve a desired effect, without the user necessarily needing to know the underlying architecture of an application. That is, the provided links can take the user to, or provide the user with, the requested content for editing. Additionally, the editing view can be styled based upon the type of content being presented. Source code content can have a different presentation than textual content.

In the various embodiments described above, server content items 42 and local content items 44 are mixed such that the source can maintain its link back to the source database as well as contain local data. Preferably, in this embodiment, a live link is marked or otherwise presented in such a way as to indicate that it links back to live content. For example, where content item 42 is a program code, users could contribute new program code to the database, they could request that new code be created, and they could insert submitted code into their source for inclusion.

To better illustrate the creation and editing of source content items 42 consider the following exemplary implementation. In this example, a collaborative content management system is used to power multiple presentations of the source content for distribution to users across the user community. The various presentations of the source content (e.g., content presentation items 44) can include links back to a source content 42, allowing end users to update the source content 42. Carrying this example further, in one embodiment as described above, the source content 42 is created on a wiki page. The source content 42 is then transformed during a build process or a run time into a number of presentation formats. In the case of an IDE, for example, these formats include an online help system installed with the application, content assist bubbles associated with editing code, or other content items. The transformed content item preferably contains links or other mechanisms directing the user back to the original source content item 42 on the wiki page. As discussed above, a URL or permalink can be used to implement such a link.

If the user desires to update or edit the content, the user can click the link, linking the user back to the source content item 42, allowing the user to edit the source content item 42 from his or her workstation 34. In another example, the transformation into multiple presentations (local content presentation items 44) is made so as to facilitate a two-way process. In this example, clicking the edit link allows the user to edit the content in place (i.e., at his or her workstation 34). The edited content of the local content presentation 44 is then be transformed back into the source format transparently in the background and uploaded to development environment 32 to update source content item 42.

Edit links can be implemented using hypertext links of various formats and configurations as well as other mechanisms to provide the user with access to the portion of the content he or she wishes to edit. Edit links or other access mechanism can also include an annotation regarding the type of content that the user is editing. For example, the edit link may be color coded or may present a different icon depending on the type of content to which it links. As another example, upon mouse rollover, a pop-up, other bubble or other indicating mechanism can provide a note to the user indicating the type of content accessible via that link. When the linking mechanism is actuated, the user can edit the associated information on the spot and behind the scenes, That is, the user can edit a new copy (i.e., create a new version) of the source content while the current copy of the source content is still published to the user community. As discussed above, server updates to incorporate such changes into the source file can be performed subsequently.

The user may be able to lock his or her local copy 44 of the content presentation item such that his or her local version remains the version accessed from his or her server. Thus, the user can freeze the content item in time or can make edits, updates or to her changes to the content to be maintained and available to that user unless and until the user unlocks the local copy. Thus, for example, a user can incorporate personal notes, annotations, references or other materials that the user may not wish to "lose" during further updates of the document. Additionally, the user may wish to make comments, notations or changes that are not shared with others in the community. However, because these scenarios may hinder the ability for the user to receive updated and improved versions of the content items, in another embodiment, personal items, user comments and annotations and other user-unique changes can be stored locally. For example, these items can be stored in an overlay file such that they are automatically (or upon invocation) brought into newer versions of the source content that may be downloaded to a user's local system. As one example, where a user creates personal annotations to be included with subsequent versions, these personal annotations can be stored in a file that is also referenced by the edit link. Thus, when a new version is downloaded, the edit links can be used to indicate which information from the user's personal overlay file should be overlaid onto the new source versions at locations associated with that link.

Figures 4, 5:
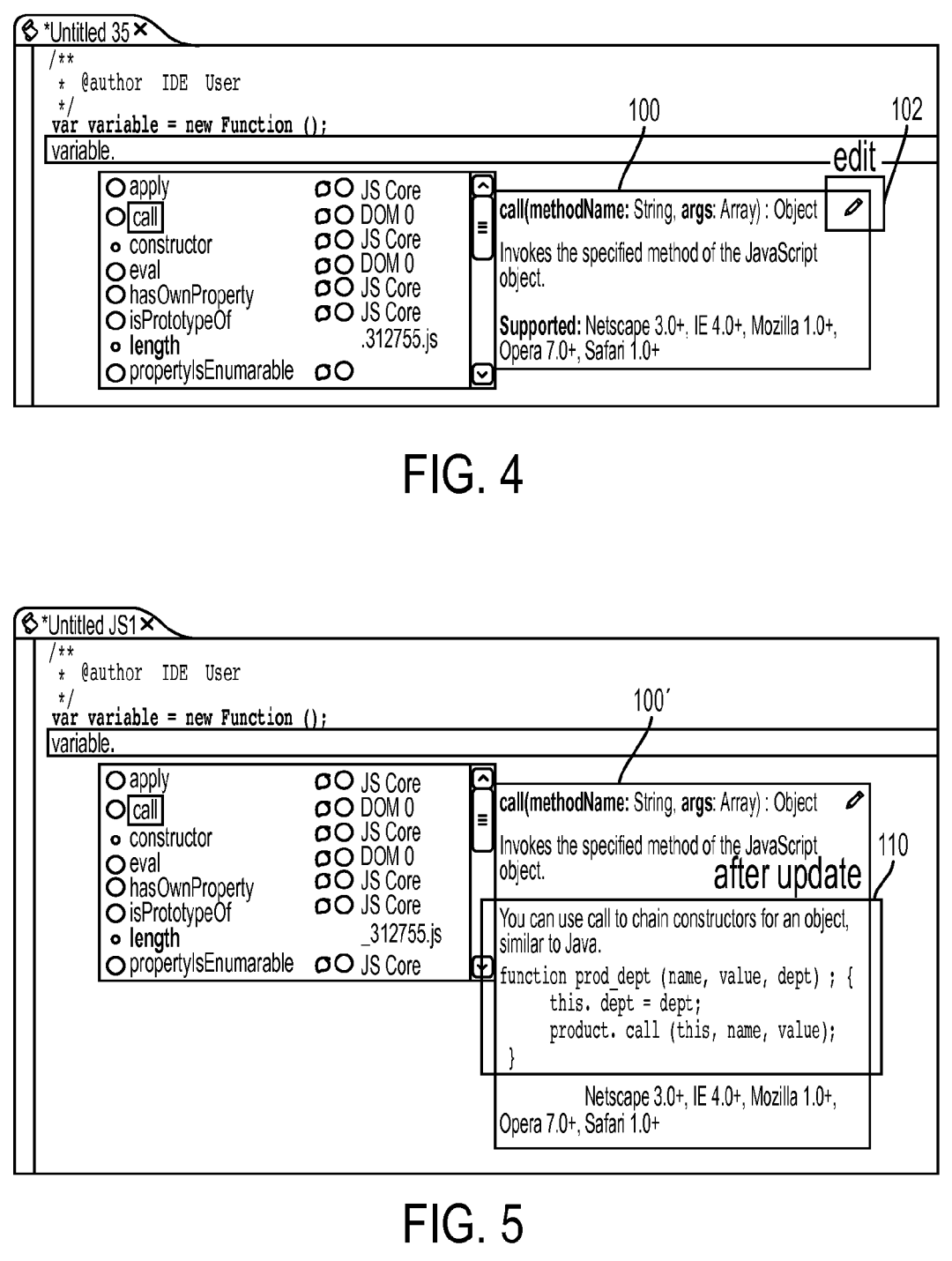
Figure 6:
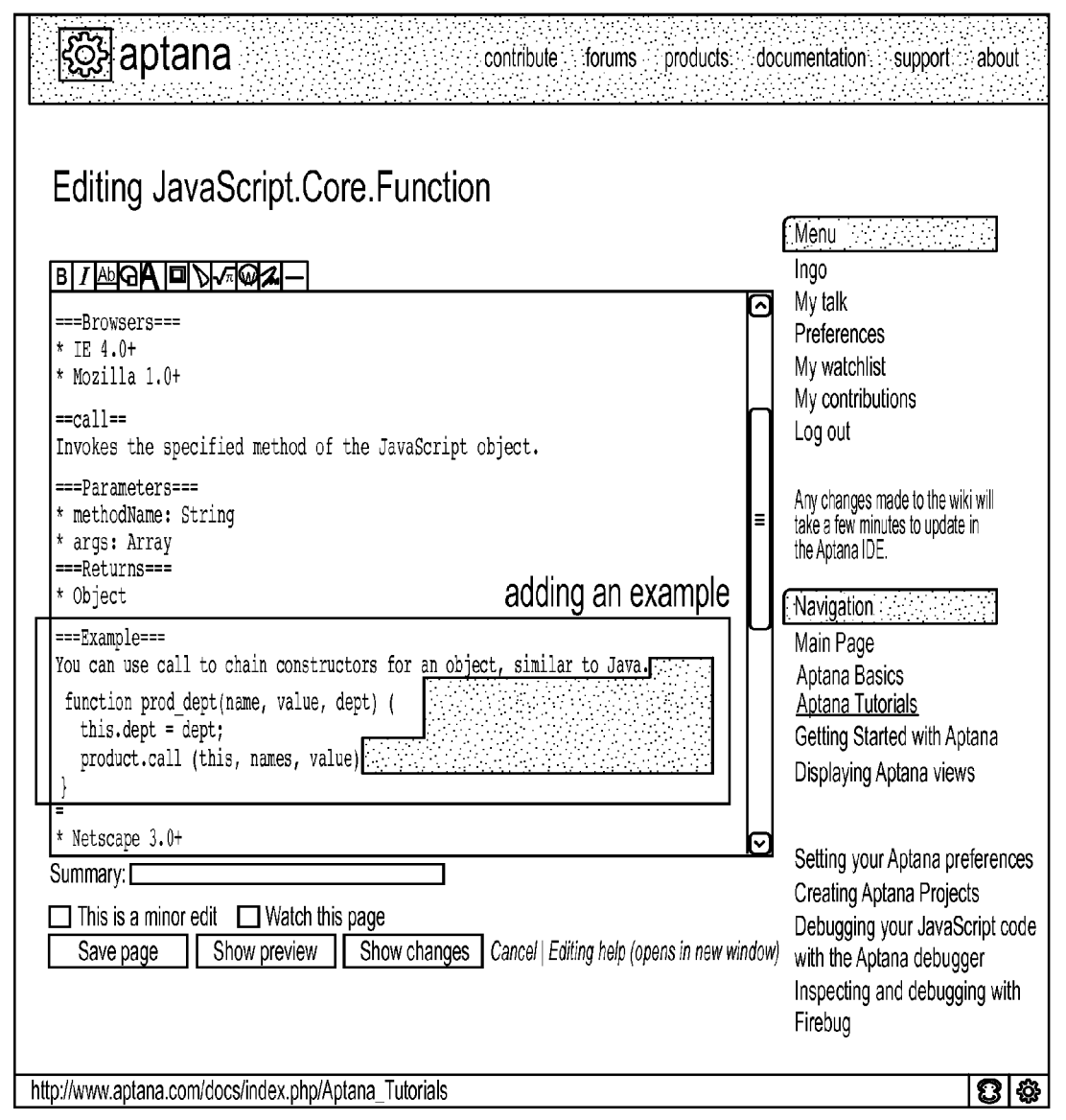

FIGS. 4-6 illustrate another more specific example of the present invention. FIG. 4 is a page of an IDE, which allows a user at a remote site 38 to review a content item 42 on the IDE in box 100. In this particular example, the content item 42 is a JavaScript.Core.Function documentation. The user at the remote site 38 accesses the page and to edit the content the user clicks on the edit box 102. In FIG. 5, the user edits the content on the wiki page by adding new content 110, to content item 42 in box 100', specifically: You can use call to chain constructors for an object, similar to Java.

function prod_dept (name, value, dept) {this.dept=dept; product.call(this, name, value);}

In FIG. 6, the new content has been uploaded and now the IDE contains the new content 110.

While various embodiments of the present invention have been described above, it should be understood that they have been presented by way of example only, and not of limitation. Thus the breadth and scope of the present invention should not be limited by any of the above-described exemplary embodiments. Additionally, the invention is described above in terms of various exemplary environments, embodiments and implementations. It should be understood that the various features and functionality described in one or more of the individual embodiments, environments or implementations are not limited in their applicability to the particular environment, embodiment, or implementation with which they are described, but instead can be applied, alone or in some combination, to one or more alternative environments, embodiments or implementations of the invention, whether or not such environments, embodiments or implementations are described and whether or not such features are presented as being a part of a described environment, embodiment, or implementation.

Terms and phrases used in this document, and variations thereof, unless otherwise expressly stated, should be construed as open ended as opposed to limiting. As examples of the foregoing: the term "including" should be read as meaning "including without limitation" or the like; the term "example" is used to provide exemplary instances of the item in discussion, not an exhaustive or limiting list thereof, and terms and phrases such as "known," "apparent to one of skill in the art," "conventional," "traditional," "normal," "standard," and terms and phrases of similar meaning should not be construed as limiting the item described to a given time period or to an item available as of a given time, but instead should be read to encompass conventional, known, apparent, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise.

The invention claimed is:

1. A method for managing content items stored at a data repository to be presented by user interfaces of a software application, where the software application is configured to be executed in an offline manner at one or more remote sites, each of which comprising a display and data storage and being connected to the data repository via a network, the method comprising the steps of:
    installing the software application on the data storage of a first remote site;
    retrieving source content items from the data repository to be used by the software application;
    transforming the source content items into a plurality of presentation formats that enable editing of the content items stored at the data repository;
    storing the source content items on the data storage of the first remote site;
    executing the software application at the first remote site;
    retrieving a first of the source content items from the data storage of the first remote site and displaying the first source content item via the display of the first remote site when any user interface of the software application comprising a first content item is requested by the software application executed at the first remote site, wherein the first source content item corresponds to the first content item;
    editing the first source content item at the first remote site to produce a first edited content item;
    storing the first edited content item on the data storage of the first remote site; and
    retrieving the first edited content item from the data storage of the first remote site and displaying the first edited content item via the display of the first remote site when any user interface of the software application comprising the first content item is requested by the software application executed at the first remote site.

2. The method of claim 1 wherein the steps of retrieving the source content items and storing the source content items on the data storage of the first remote site is accomplished concurrently with the step of installing the software application on the data storage of a first remote site.

3. The method of claim 1 further comprising the step of transmitting the first edited content item from the first remote site to the data repository.

4. The method of claim 3 further comprising the step of incorporating the first edited content item into the source content items resulting in a first edited source content items.

5. The method of claim 4 further comprising:
    installing the software application on the data storage of a second remote site;
    retrieving the first edited source content items from the data repository to be used by the software application;
    storing the first edited source content items on the data storage of the second remote site; and
    retrieving the first edited content item from the data storage of the second remote site and displaying the first edited content item via the display of the second remote site when any user interface of the software application comprising the first content item is requested by the software application executed at the second remote site.

6. The method of claim 4 further comprising:
    installing the software application on the data storage of a second remote site;
    retrieving the source content items to be used by the software application from the data repository;
    storing the source content items on the data storage of the second remote site;
    executing the software application at the second remote site; and
    retrieving the first source content item from the data storage of the second remote site and displaying the first source content item via the display of the second remote site when any user interface of the software application comprising the first content item is requested by the software application executed at the second remote site.

7. The method of claim 6 further comprising:
    retrieving the first edited content item from the data repository;
    storing the first edited content item on the data storage of the second remote site; and
    retrieving the first edited content item from the data storage of the second remote site and displaying the first edited content item via the display of the second remote site when any user interface of the software application comprising the first content item is requested by the software application executed at the first remote site.

8. The method of claim 6 further comprising:
    retrieving the first edited source content items from the data repository;
    storing the first edited source content items on the data storage of the second remote site; and
    retrieving the first edited content item from the data storage of the second remote site and displaying the first edited content item via the display of the second remote site when any user interface of the software application comprising the first content item is requested by the software application executed at the first remote site.

9. The method of claim 8 further comprising:
    editing a second of the source content items at the second remote site resulting in a second edited content item, wherein the second source content item corresponds to a second content item;
    storing the second edited content item on the data storage of the second remote site; and
    displaying the second edited content item on the display of the second remote site when any user interface comprising the second content item is requested by the software application at the second remote site.

10. The method of claim 4 further comprising the step of authorizing the first edited content item to be incorporated into the source content items.

11. The method of claim 4 further comprising the step of allowing an authority to accept or reject the first edited content item.

12. The method of claim 4 further comprising:
    editing a second of the source content items at the first remote site resulting in a second edited content item, wherein the second source content item corresponds to a second content item;
    storing the second edited content item on the data storage of the first remote site; and
    displaying the second edited content item on the display of the first remote site when any user interface comprising the second content item is requested by the software application executed at the first remote site.

13. The method of claim 12 further comprising:

retrieving the first edited source content items from the data repository;

storing the first edited source content items on the data storage of the first remote site;

incorporating the second edited content item into the first edited source content items stored on the data storage of the first remote site;

retrieving the first edited content item from the data storage of the first remote site and displaying the first edited content item via the display of the first remote site when any user interface comprising the first content item is requested by the software application executed at the first remote site; and retrieving the second edited content item from the data storage of the first remote site and displaying the second edited content item via the display of the first remote site when any user interface comprising the second content item is requested by the software application executed at the first remote site.

14. The method of claim 1 wherein the data repository is a wiki.

15. The method of claim 14 wherein the content items may be edited directly via the wiki.

16. The method of claim 1 wherein the software application is an integrated development environment.

17. The method of claim 1 wherein the first content item is associated with an identifier.

18. The method of claim 17 wherein the identifier is a universal resource locator (URL).

19. The method of claim 18 wherein the URL is a permalink.

20. The method of claim 1 further comprising the step of receiving the software application at the first remote site from the data repository.

* * * * *